United States Patent [19]

Cordes, III

[11] 4,054,719

[45] Oct. 18, 1977

[54] PHENACYL ESTER PHOTOSENSITIZERS FOR RADIATION-CURABLE COATINGS

[75] Inventor: William Frederick Cordes, III, East Brunswick, N.J.

[73] Assignee: American Cyanamid Company, Stamford, Conn.

[21] Appl. No.: 744,367

[22] Filed: Nov. 23, 1976

[51] Int. Cl.$^2$ .............................. C08F 2/46; C08F 4/00
[52] U.S. Cl. .................................. 428/461; 96/115 P; 204/159.23; 204/159.18; 427/54; 428/913
[58] Field of Search ...................... 204/159.23, 159.18; 427/54; 428/461

[56] References Cited

U.S. PATENT DOCUMENTS

| 3,874,376 | 4/1975 | Dart et al. | 128/90 |
| 3,915,824 | 10/1975 | McGinniss | 204/159.23 |
| 3,922,426 | 11/1975 | Feltzin | 428/295 |

*Primary Examiner*—Richard B. Turer
*Attorney, Agent, or Firm*—Philip Mintz

[57] ABSTRACT

An ultraviolet radiation-curable composition is provided which comprises a polyethylenically unsaturated compound and effective photosensitizing amounts of (a) a phenacyl ester, and (b) a tertiary aliphatic amine.

13 Claims, No Drawings

PHENACYL ESTER PHOTOSENSITIZERS FOR RADIATION-CURABLE COATINGS

BACKGROUND OF THE INVENTION

This invention relates to ultraviolet radiationcurable coating compositions. More particularly it relates to photopolymerizable coating compositions containing a phenacyl ester photosensitizer and a tertiary aliphatic amine, and to polymerized coatings obtainable therefrom.

It is well-known that polymerizable coating compositions can be cured by exposure to actinic radiation, such as ultraviolet light. In general, such compositions comprise (a) a photopolymerizable polyethylenically unsaturated compound and (b) a photosensitizer, with or without (c) a colorant. Various photosensitizers such as acetophenones, benzoin acetate, benzaldehydes, benzoins, and 2,2-dialkoxyacetophenones, used alone or in combination with a trialkylamine, have been used as initiators for photopolymerizations. See Leekley, et al., U.S. Pat. No. 3,081,168; Sandner, et al., U.S. Pat. No. 3,715,293 and Shur, et al., U.S. Pat. No. 3,772,062. Since none of the known photosensitizers has been found to be completely satisfactory, research continues in order to find compounds or mixtures which will be more satisfactory. The present invention arose out of such research and resulted in the discovery of novel photosensitizer compositions which are useful for the photopolymerization of radiation-curable compositions.

SUMMARY OF THE INVENTION

I have discovered photopolymerizable compositions comprising (a) an effective amount of a photosensitizer compound represented by Formula (I):

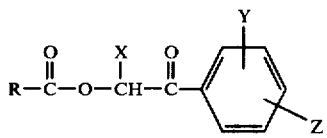

(I)

wherein R is an alkyl radical of 1 to 7 carbon atoms, X is selected from hydrogen or alkyl of 1 to 8 carbon atoms, and Y and Z are independently selected from hydrogen, alkyl of 1 to 8 carbon atoms, alkoxy of 1 to 8 carbon atoms, halogen, or phenyl; (b) an effective amount of a tertiary aliphatic amine, and (c) a polyethylenically unsaturated organic compound.

More particularly, this invention relates to a composition comprising (a) an effective amount of a photosensitizer compound represented by Formula (II):

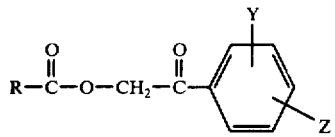

(II)

wherein R is as defined above, and Y and Z are independently selected from hydrogen or alkyl of 1 to 8 carbon atoms; (b) an N-alkyldiethanolamine, wherein the N-alkyl radical has 1 to 8 carbon atoms, and (c) an ester of a polyol and an α, β-unsaturated acid.

Still more particularly, this invention relates to a composition comprising (a) an effective amount of a photosensitizer compound represented by Formula (III):

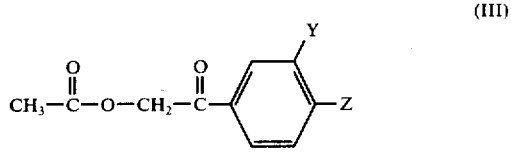

(III)

wherein Y and Z are independently hydrogen or alkyl of 1 to 8 carbon atoms, (b) N-methyldiethanolamine, and (c) 1,1,1-trimethylolpropane triacrylate.

The photopolymerizable compositions of this invention are advantageous because they can be rapidly cured to obtain mar-resistant coatings.

DESCRIPTION OF PREFERRED EMBODIMENTS

The phenacyl esters of this invention have not heretofore been known to be useful photosensitizers, in combination with trialkylamines, for curing radiation-curable coating compositions. They may be prepared by reacting a suitable phenacyl halide, such as phenacyl bromide, with a suitable organic acid in the manner described by Shriner and Fuson, "Identification of Organic Compounds" pg 157, John Wiley and Sons, Inc., New York, Third Edition (1948), which is hereby incorporated by reference.

Illustrative examples of phenacyl halides which may be used include: phenacyl bromide, phenacyl chloride, 4-methylphenacyl bromide, 4-phenylphenacyl bromide, 3-chlorophenacyl bromide, 4-chlorophenacyl bromide, 4-bromophenacyl chloride, 2,4-dmethylphenacyl chloride, 3,4-dimethylphenacyl bromide, α-n-octylphenacyl bromide, α-methylphenacyl bromide; 4-n-octyloxyphenacyl bromide, 4-methoxyphenacyl bromide, 3,4-dimethoxyphenacyl bromide, 2,5-diethoxyphenacyl bromide, 4-cyclohexylphenacyl bromide, 4-chloro-3-methylphenacyl bromide, 3 chloro-4-ethoxyphenacyl bromide, and the like.

The phenacyl halide may be prepared in the manner described by Cowper and Davidson for the preparation of phenacyl bromide, see "Organic Syntheses Collective Vol. 2" pp 480–481, John Wiley and Sons, Inc., New York, Fifth Printing (1948), which is hereby incorporated by reference.

Illustrative examples of the photosensitizer compounds of Formula (I) useful in the compositions of this invention include the following:

phenacyl acetate,
phenacyl propionate,
phenacyl butyrate,
phenacyl n-octanoate,
4-methylphenacyl acetate,
4-phenylphenacyl acetate,
3-chlorophenacyl acetate,
4-chlorophenacyl acetate,
4-bromophenacyl acetate,
2,4-dimethylphenacyl acetate,
3,4-dimethylphenacyl acetate,
4-phenylphenacyl acetate,
4-n-octylphenacyl acetate,
α-methylphenacyl acetate,
4-methoxyphenacyl acetate,
3,4-dimethoxyphenacyl acetate, 2,5-dimethylphenacyl acetate,
2,5-diethoxyphenacyl acetate,
4-cyclohexylphenacyl acetate,
4-chloro-3-methylphenacyl acetate,
3-chloro-4-ethoxyphenacyl acetate,
4-n-octyloxyphenacyl acetate,
4-ethoxyphenacyl acetate,
α-n-octylphenacyl acetate, and the like.

Illustrative examples of tertiary aliphatic amines which can be used in combination with the photopolymerizable compound and photosensitizer of Formula (I) include triethanolamine, N-n-butyldiethanolamine, N-ethyldiethanolamine, N-methyldiethanolamine, triethylamine, morpholine, and the like, and mixtures thereof. The tertiary aliphatic amine must be compatible with the photopolymerizable composition and not significantly effect the polymerization rate thereof when exposed to ultraviolet light. The preferred amine is N-methyldiethanolamine.

In addition to the phenacyl esters and tertiary aliphatic amines listed hereinabove the coating composition can also include other known photosensitizers.

Illustrative examples of known photosensitizers which may also be present in the coating composition include such compounds as acetophenone, benzophenone, xanthone, fluorene, fluorenone, benzaldehyde, anthraquinone, 4-methoxybenzophenone, benzoin, 2-chloroanthraquinone, polychlorinated polyphenyl resins, such as the Arochlors (Monsanto Chemical Co.); benzoin acetate, benzoin methyl ether, benzoin isobutoxymethyl ether; polybenzoin, 2,2-diethoxyacetophenone; 2,2-dimethoxyacetophenone, 2-tert-butylanthraquinone, 2-methylanthraquinone, azoisobutyronitrile, and the like.

The present invention is applicable to the coating, or printing, of various substrates such as paper, cardboard, boxboard, wood, metals, textiles, plastics, and the like. The substrate may be in any convenient form such as films, sheets, rods, tubes, tubing, filaments, or shaped articles, such as bottles, cans, and the like. The substrate itself can be preprinted and overcoated with a clear photopolymerizable composition. The substrate may be printed by including a colorant in the photopolymerizable composition and then overcoated with a clear coating.

The photopolymerizable compounds useable in the present invention are free radical polymerizable polyfunctional ethylenically unsaturated monomers and prepolymers, e.g., dimers, trimers and other oligomers; and mixtures and copolymers thereof. The term "polyethylenically unsaturated" as used herein refers to compounds having two or more terminal ethylene groups. The photopolymerizable monomers and prepolymers may be generally described as the acrylic, methacrylic and itaconic acid esters of aliphatic polyhydric alcohols such as, for example, the di-and polyacrylates, the di-and polymethacrylates and the di-and polyitaconates of ethylene glycol, triethylene glycol, tetraethylene glycol, tetramethylene glycol, trimethylolethane, trimethylolpropane, pentaerythritol, dipentaerythritol, and the like, and their prepolymers. Typical compounds include, but are not limited to, 1,1,1-trimethylolpropane propane triacrylate, 1,1,1-trimethylolpropane trimethacrylate, 1,1,1-trimethylolpropane triitaconate, pentaerythritol tetraacrylate, pentaerythritol tetramethacrylate, 1,1,1-trimethylolethane triacrylate, 1,1,1-trimethylolethane trimethacrylate, tetramethylene glycol diacrylate, ethylene glycol dimethacrylate, tetraethylene glycol diacrylate, triethylene glycol dimethacrylate, tetraethylene glycol dimethacrylate, and the like; and the prepolymers and mixtures thereof.

The above-described esters may be obtained in any convenient manner, for example, by ester interchanging a lower alkyl ester of the acid with the alcohol in the presence of a suitable catalyst, or by the reaction of the alcohol with the acid, e.g. acrylic or methacrylic acid.

The concentration of the photosensitizer which is required in order to achieve maximum photosensitization varies according to the organic material of the composition, the intensity of the light radiation and of the duration of exposure. However, for most purposes it is sufficient to use an amount of the compound of Formula I within the range of about 2 percent to 10 percent by weight, preferably within the range of about 5 percent to 7 percent by weight, on the weight of the untreated radiation-curable composition. The concentration of the tertiary aliphatic amine in the combination is generally the same as the concentration of the photosensitizer.

The ingredients may be combined by any of the well-known procedures, for example, by mixing, grinding, or heating. The resulting composition is applied in any suitable manner onto the surface of the substrate. The compositions of the present invention may be used in relatively thick layers, or as thin films, having a thickness of about 2 to 150 microns. The film thickness is usually about 10 microns.

Any suitable source of emission may be used which emits radiation from about 2,000–8,000 Angstroms, preferably about 2,500–4,500 Angstroms. Suitable sources are mercury vapor lamps, mercury arcs, carbon arcs, xenon arcs, sunlamps, lasers, and the like. All of these devices and sources are well-known in the art. Particularly efficient sources are the ultraviolet mercury lamps and swirl-flow plasma arc radiation devices described in U.S. Pat. No. 3,364,387.

While any source of ultraviolet emission can be used, as indicated above, the particular apparatus used in the exemplification of this invention was a Hanovia Ultraviolet Curing Systems Model 45080 (Conrad Precision Industries, Inc., Newark, N.J.) having a 2500 watt Hanovia medium pressure mercury vapor ultraviolet lamp having a beam width of about 1–2 inches placed about 2.5 inches above the coated substrate. The substrate was a matted 4 inches × 8 inches × 0.032 inch steel panel, (Model R-48; The Q-Panel Company, Cleveland, Ohio) placed on a conveyor which moves at speeds from about 70–410 feet per minute, preferably about 180 feet per minute. The dwell time of the coating under the beam ranges from about 0.01–0.14 second, preferably about 0.028–0.055 second.

Optionally, the compositions of this invention may also contain other additives such as antioxidants, plasticizers, light stabilizers, lubricants, antistatic agents, anti-slipping agents and colorants such as dyes and pigments, and the like.

Illustrative colorants include organic and inorganic pigments such as Phthalocyanine Blue 20, Chrome Yellow, Molybdate Orange, Lithol Rubine Red, Titanium White, and the like, and mixtures thereof.

In the examples which follow the irradiated composition is considered cured when it is non-sticky by touching. The composition is considered mar-resistant if it resists scratching when scraped with a laboratory spatula.

EXAMPLE 1

Preparation of Phenacyl Acetate

Five grams of acetic acid are added to 25 mls. of water in a suitable vessel and carefully neutralized with 10% aqueous sodium hydroxide. A few drops of acetic acid are then added until the solution is just acid to litmus paper. Fifty milliliters of ethanol and 5 grams of phenacyl bromide are then added and the mixture is refluxed for 1 hour. If a solid separates during refluxing additional ethanol is added to dissolve the same. The solution is allowed to cool and the phenacyl acetate is recovered by filtration and purified by recrystallization from ethanol, m.p. 47°–48° C.

EXAMPLE 2

Following the procedure of Example 1, 5 grams of 4-methylphenacyl bromide reacted with 5 grams of acetic acid to obtain 4-methylphenacyl acetate, m.p. 85°–85° C.

EXAMPLE 3

Following the procedure of Example, 1, 5 grams of 4-phenylphenacyl bromide are reacted with 5 grams of acetic acid to obtain 4-phenylphenacyl acetate, m.p. 109°–110° C.

EXAMPLE 4

Following the procedure of Example 1, 5 grams of 3,4-dichlorophenacyl chloride are reacted with 5 grams of acetic acid to obtain 3,4-dichlorophenacyl acetate, m.p. 68°–70° C.

EXAMPLE 5

Following the procedure of Example 1,5 grams of 2,4-dimethylphenacyl chloride are reacted with 5 grams of acetic acid to obtain 2,4-dimethylphenacyl acetate, m.p. 43°–45° C.

EXAMPLE 6

Following the procedure of Example 1,5 grams of 3,4-dimethoxyphenacyl bromide are reacted with 5 grams of acetic acid to obtain 3,4-dimethoxyphenacyl acetate, m.p. 82°–84° C.

EXAMPLE 7

Following the procedure of Example 1, 5 grams of 4-ethoxyphenacyl bromide are reacted with 5 grams of acetic acid to obtain 4-ethoxyphenacyl acetate, m.p. 81°–82° C.

EXAMPLE 8

Following the procedure of Example 1, 5 grams of 4-n-octyloxyphenacyl bromide are reacted with 5 grams of acetic acid to obtain 4-n-octyloxyphenacyl acetate, m.p. 44°–45° C.

EXAMPLE 9

Following the procedure of Example 1, 5 grams of 4-phenylphenacyl bromide are reacted with 5 grams of butyric acid to obtain 4-phenylphenacyl butyrate, m.p. 82° C.

Evaluation of Photopolymerization of Compositions

EXAMPLES 10 - 13

A. Combination of Photosensitizer and Tertiary Aliphatic Amine

Separate mixtures are prepared comprising 100 parts by weight of 1,1,1-trimethylolpropane triacrylate, 5 parts by weight of N-methyldiethanolamine and 5 parts by weight of the phenacyl ester being tested. The compositions are applied to separate matted steel panels (Model R-48, The Q Panel Company, Cleveland, Ohio) at a wet film thickness of 0.5 mil. The wetcoated substrate is then exposed to ultraviolet radiation by being placed on a conveyor belt and passed under a 2500 watt medium pressure mercury vapor lamp (Hanovia Ultraviolet Curing Systems, Model 45080) at a distance of about 2.5 inches. The duration of exposure is 0.028 second for each pass under the lamp. After each pass under the lamp the coating is tested for cure and mar-resistance, as described previously. The results obtained are shown in Table I.

Table I

| Example | Phenacyl Ester from Example | Number of Passes to Obtain | |
|---|---|---|---|
| | | Cure | Mar-Resistance |
| 10 | 1 | 1 | 1 |
| 11 | 2 | 1 | 2 |
| 12 | 3 | 1 | 6 |
| 13 | 4 | 1 | >6 |

B. Evaluation Without Tertiary Aliphatic Amine

Comparison tests were also carried out with compositions containing 100 parts by weight of 1,1,1-trimethylolpropane triacrylate and 5 parts by weight of the phenacyl esters from Examples 1–4, respectively. These compositions remained uncured after six passes under the ultraviolet lamp.

C. Evaluation Without Photosensitizer

Comparison tests were also carried out with compositions containing 100 parts by weight of 1,1,1-trimethylolpropane triacrylate and 5 and 10 parts by weight, respectively, of N-methyldiethanolamine. These compositions remained uncured after six passes under the ultraviolet lamp.

EXAMPLES 14 - 18

Following the procedure of Examples 10–13, compositions are prepared and tested, comprising 100 parts by weight of 1,1,1-trimethylolpropane trimethacrylate, 5 parts by weight of N-ethyldiethanolamine, and 5 parts by weight of a phenacyl ester from Examples 5–9, respectively. Similar results are obtained in that all compositions are cured after one pass under the ultraviolet lamp.

I claim:

1. A liquid coating composition curable by ultraviolet radiation comprising a photopolymerizable polyethylenically unsaturated ester of an $\alpha$, $\beta$-ethylenically unsaturated acid and a polyhydric alcohol and effective photopolymerizing amounts of (1) a tertiary aliphatic amine and (2) a phenacyl acetate represented by the formula:

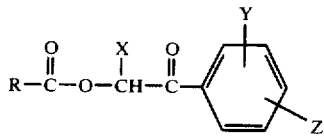

wherein R is an alkyl radical of 1 to 7 carbon atoms, X is selected from hydrogen or alkyl of 1 to 8 carbon atoms, and Y and Z are each selected from hydrogen, alkyl of 1 to 8 carbon atoms, alkoxy of 1 to 8 carbon atoms, halogen or phenyl.

2. A coating composition according to claim 1 wherein said polymerizable ester is an ester of a polyhydric alcohol and acrylic, methacrylic or itaconic and said tertiary aliphatic amine is an N-alkyldiethanolamine.

3. A coating composition according to claim 2 wherein said polymerizable ester is 1,1,1-trimethylolpropane triacrylate and said tertiary aliphatic amine is N-methyldiethanolamine.

4. A coating composition according to claim 1 wherein said phenacyl acetate and said tertiary aliphatic amine are each present in an amount of from about 2 to 10 percent by weight of said polymerizable ester.

5. A coating composition according to claim 3 wherein X, Y and Z are hydrogen.

6. A coating composition according to claim 5 wherein R is methyl.

7. A coating composition according to claim 6 wherein said phenacyl acetate and said N-methyldiethanolamine are each present in an amount of from about 2 to 10 percent by weight of said polymerizable ester.

8. A coating composition according to claim 7 wherein said phenacyl acetate and said N-methyldiethanolamine are each present in an amount of from about 5 to 7 percent by weight of said polymerizable ester.

9. A coating composition according to claim 8 comprising 5 parts by weight of phenacyl acetate and 5 parts by weight of N-methyldiethanolamine per 100 parts by weight of 1,1,1-trimethylolpropane triacrylate.

10. A method for coating a substrate with a polymeric coating which comprises coating said substrate with a composition of claim 1 and then exposing said coated substrate to an effective photopolymerizing amount of ultraviolet radiation.

11. A method according to claim 10 wherein said composition comprises 1,1,1-trimethylolpropane triacrylate and from 2 to 10 percent by weight thereof of each of (1) phenacyl acetate and (2) N-methyldiethanolamine.

12. The coated substrate obtained according to the method of claim 10.

13. The coated substrate obtained according to the method of claim 11.

* * * * *